United States Patent Office 2,753,356
Patented July 3, 1956

2,753,356

1,4-DIAMINO-2,3-ANTHRAQUINONE-DICARBOXIMIDES

Joseph F. Laucius and Stanley B. Speck, Wilmington, Del., assignors to E. I. du Pont de Nemours & Company, Wilmington, Del., a corporation of Delaware No Drawing. Application February 11, 1953,
Serial No. 336,447

5 Claims. (Cl. 260—326)

This invention relates to the preparation of new compounds, and more particularly 1,4-diamino-2,3-anthraquinone-dicarboximides which are useful as dyes, especially for the new polyethylene terephthalate fiber now known as "Dacron" fiber.

In the Jr. Society of Dyers of Colourists, 1946, page 348, it is pointed out that the discovery of dyes which are suitable for the coloring of the new polyethylene terephthalate fiber, and the methods for applying these dyes, has presented a real problem. This has been further discussed in an article in the American Dyestuff Reporter, 1948, page 699. The finding of satisfactory blue dyes for all types of fibers has presented a peculiar problem, that is, where affinity, light fastness and other fastness properties are of particular importance, and in the dyeing of the new polyethylene terephthalate fibers the finding of a blue dye which has sufficient affinity for this fiber and yet will exhibit the necessary fastness properties is still a problem. This is more particularly discussed in the American Dyestuff Reporter, 1951, page 54, wherein the new fiber is designated as "Fiber V."

This invention has for its object to produce new compounds of the anthraquinone series that are suitable for the coloring of new polyethylene terephathlate fibers known as "Dacron." A more specific object of the invention is to prepare 1,4-diamino-2,3-anthraquinone-dicarboximides which are useful in the dyeing of the new fiber "Dacron" in blue shades having good fastness to light, washing and gas fumes.

The new compounds of this invention have the general formula:

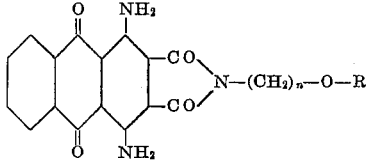

in which R stands for a radical of the group consisting of alkyl and alkoxy alkyl groups containing not more than 4 carbon atoms, and $n$ stands for an integer from 3 to 4.

The compounds of this invention may be prepared by heating 1,4-diamino-2,3 - anthraquinone - dicarboximide (prepared as disclosed in our co-pending application Serial No. 260,086, now U. S. Patent 2,628,963, issued February 17, 1953) with the alkoxyalkylamine in an organic solvent.

As illustrated in our co-pending application, the 1,4-diamino-2,3-anthraquinone-dicarboximide may be prepared from the corresponding 1,4-diamino-2,3-anthraquinone-dicarbonitrile as follows:

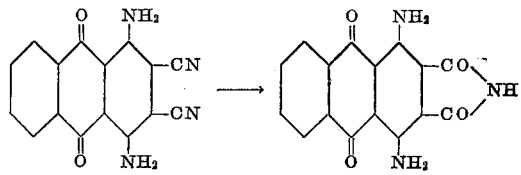

To a stirred solution of 630 parts of 98.2% sulfuric acid heated to 80° C. there was added 126 parts of dried, powdered, 1,4-diamino-2,3-anthraquinone-dicarbonitrile. An exothermic reaction occurred and the temperature rose to 140° C. The mixture was heated for one hour at 150° C. and then cooled to from 40° to 45° C. Enough water (255 parts by weight) was added at 40° to 45° C. dropwise to make a 70% acid solution. After cooling to room temperature the orange crystals were separated by filtration and washed with 70% sulfuric acid. The orange crystals were slurried with water at from 70° to 80° C. for 1½ hours with a color change from orange to blue. The blue crystals were separated by filtration and washed with hot water until the filtrate was acid-free. After drying, a 73% yield of 1,4-diamino-2,3-anthraquinone-dicarboximide was obtained. From the 70% sulfuric acid solution an additional 20% yield of less pure compound was obtained by drowning the sulfuric acid solution in 5000 parts of water and isolating the 1,4-diamino-2,3-anthraquinone-dicarboximide by filtration and washing until the filtrate was acid-free. The 1,4-diamino-2,3-anthraquinone-dicarboximide prepared by this method had 13.40% N (theory for $C_{16}H_9O_4N_3$ is 13.66% N).

The following example is given to illustrate the invention. The parts used are by weight.

EXAMPLE

*1,4-diaminoanthraquinone-N-gamma-methoxypropyl-2,3-dicarboximide*

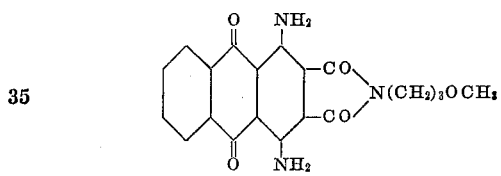

A mixture of 40 parts of 1,4-diaminoanthraquinone-2,3-dicarboximide, 14 parts of gamma-methoxypropylamine, 158 parts of methanol and 240 parts of nitrobenzene is heated for 16 hours at 175° C. After cooling to room temperature, the desired compound is isolated by filtration, washing with methanol and finally with water, and drying. The yield of 1,4-diamino-anthraquinone-N-gamma-methoxypropyl-2,3-dicarboximide is 43 parts (87% of theoretical) and nitrogen analysis shows 11.80% N (theory=11.08% N). When the same process is carried out at a reaction temperature of 185° C., the product has a N-content of 11.25%.

This compound dyes polyethylene terephthalate fiber and cellulose acetate in a bright blue shade of good light and wash fastness.

Other alkoxyalkylamines and alkoxyalkoxyalkylamines may be substituted for the particular amines employed in the above example to give similar dyes which exhibit good-to-excellent light and wash fastness on polyethylene terephthalate fibers and on cellulose acetate. As further illustrations of the type of alkoxyalkylamines which may be substituted in the above examples are delta-methoxybutyl-amine, gamma-isopropoxypropylamine, ethoxypropylamine, methoxyethoxypropylamine, delta-butoxybutyl-amine and delta-ethoxyethoxy-butylamine. When substituted in the above example, these alkoxyalkylamines give the following 1,4-diamino-2,3-anthraquinone dicarboximides in the order named:

1,4-diaminoanthraquinone-N-delta-methoxybutyl - 2,3-dicarboximide, 1,4 - diaminoanthraquinone - N - gamma - isopropoxypropyl-2,3-dicarboximide, 1,4-diaminoanthraquinone-N-ethoxypropyl - 2,3 - dicarboximide, 1,4-diaminoanthraquinone - N - methoxyethoxypropyl-2,3-dicarboximide, 1,4-diaminoanthraquinone-N-delta - butoxybutyl - 2,3-dicarboximide, and 1,4-diaminoanthraquinone-N-delta - ethoxyethoxybutyl-2,3-dicarboximide.

As illustrated in the above list of amines that may be employed, the terminal alkyl group may be either straight or branched chain.

The compounds of this invention for which the general formula is given above all exhibit desirable blue shades on polyethylene terephthalate fiber and on cellulose acetate, and also good-to-excellent fastness to light and washing.

The compounds of this invention may be used as individuals or in mixtures with each other, or mixtures with the alkyl and hydroxyalkyldicarboximides of our co-pending U. S. Patent No. 2,628,963. Such mixtures of dicarboximides can be prepared by making each compound separately and mixing, or by using a mixture of amines in the alkylation reaction.

The 1,4-diaminoanthraquinone-N-methoxypropyl - 2,3-dicarboxyimide of this series exhibits outstanding affinity for both the polyethylene terephthalate and cellulose acetate fibers, so that quite deep shades can be obtained. The fastness properties of this series of dyes on these fibers are good-to-excellent.

The conditions for carrying out the reactions specifically illustrated in the examples may be altered. The time and temperatures may be changed, and temperatures of from 100° to 190° C. will give satisfactory results. The reaction is preferably carried out in the presence of an alcohol and a higher boiling inert solvent. Ethylene glycol or other alcohols may be substituted for the methanol employed in the specific example, such as ethyl alcohol, isopropyl alcohol, octyl alcohol, 2-methoxyethyl alcohol, etc. The proportions of alcohol and higher boiling organic solvent such as nitrobenzene or orthodichlorobenzene may be varied over a wide range.

We claim:

1. 1,4-diamino-2,3-anthraquinone - dicarboximides of the general formula:

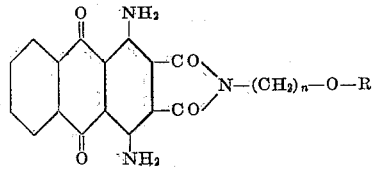

in which R stands for a radical of the group consisting of alkyl and alkoxy alkyl groups containing not more than 4 carbon atoms, and $n$ stands for an integer of from 3 to 4.

2. 1,4-diaminoanthraquinone-N-gamma - methoxypropyl-2,3-dicarboximide.

3. 1,4-diaminoanthraquinone-N-gamma - ethoxypropyl-2,3-dicarboximide.

4. 1,4-diaminoanthraquinone-N-gamma - methoxyethoxypropyl-2,3-dicarboximide.

5. 1,4-diaminoanthraquinone-N - delta - methoxybutyl-2,3-dicarboximide.

References Cited in the file of this patent

UNITED STATES PATENTS 2,628,963   Laucius _____ Feb. 17, 1953

OTHER REFERENCES

Georgievics et al.: A Textbook of Dye Chem., p. 7, (1920).